United States Patent [19]

Masuda et al.

[11] Patent Number: 4,458,580
[45] Date of Patent: Jul. 10, 1984

[54] POWER STEERING APPARATUS

[75] Inventors: Naosuke Masuda, Higashimatsuyama; Yoshio Suzuki, Menuma; Tadaaki Fujii, Higashimatsuyama, all of Japan

[73] Assignee: Jidosha Kiki Co., Ltd., Tokyo, Japan

[21] Appl. No.: 359,410

[22] Filed: Mar. 18, 1982

[30] Foreign Application Priority Data

| Mar. 25, 1981 | [JP] | Japan | 56-43492 |
| Mar. 30, 1981 | [JP] | Japan | 56-46824 |
| Apr. 10, 1981 | [JP] | Japan | 56-54179 |
| Apr. 30, 1981 | [JP] | Japan | 56-65434 |

[51] Int. Cl.³ ............................................. F15B 9/10
[52] U.S. Cl. .................................... 91/375 R; 180/132
[58] Field of Search ............... 91/375 R, 375 A, 467, 91/470; 267/158, 164, 182; 180/132

[56] References Cited

U.S. PATENT DOCUMENTS

| 2,263,113 | 11/1941 | Wichorek et al. | 464/77 |
| 2,484,321 | 10/1949 | Stubau | 464/77 |
| 2,917,079 | 12/1959 | Verbrugge et al. | 91/375 R |
| 2,983,283 | 5/1961 | Sattavara | 137/622 |
| 3,131,602 | 5/1964 | Ford | 91/375 R |
| 3,145,626 | 8/1964 | Vickers et al. | 91/375 A |
| 3,162,263 | 12/1964 | Brown, Jr. | 91/375 A |
| 3,227,178 | 1/1966 | Elwell | 137/625.21 |
| 3,273,465 | 9/1966 | Eddy | 91/375 A |
| 3,722,368 | 3/1973 | Suzuki | 91/375 R |
| 4,057,079 | 11/1977 | Taig | 137/625.23 |
| 4,117,864 | 10/1978 | Taig | 91/375 R |
| 4,214,642 | 7/1980 | Dauvergne | 180/132 |

FOREIGN PATENT DOCUMENTS

| 4318330 | 3/1980 | Japan . |
| 55-42698 | 3/1980 | Japan . |
| 1030277 | 5/1966 | United Kingdom . |

Primary Examiner—Paul E. Maslousky
Attorney, Agent, or Firm—Flynn, Thiel, Boutell & Tanis

[57] ABSTRACT

A power steering apparatus includes a pair of projections formed on the input and the output side, respectively, and also includes a substantially C-shaped spring disposed in surrounding relationship with the input shaft so that the both projections are maintained in their neutral position. In the neutral position, a circumferential clearance between the end faces of a notch formed in the spring and the projections is maintained substantially zero. The projection formed on the input side engages the lateral side of an inner race of a bearing which rotatably carries the input shaft, thereby preventing a withdrawal of the input shaft. Hydraulic fluid used in the control valve is utilized to define a hydraulic bearing between the input and the output shaft.

15 Claims, 10 Drawing Figures

POWER STEERING APPARATUS

BACKGROUND OF THE INVENTION

The invention relates to a power steering apparatus, and more particularly, to a power steering apparatus including a control valve of rotary type which controls the supply to or discharge from a power cylinder of a hydraulic fluid.

A control valve of rotary type is normally formed of a valve rotor which is integrally formed on an input shaft which is disposed on the steering wheel side, and a valve sleeve which is integrally formed on an output shaft adapted to be connected to a steerable road wheel and rotatable around the outer periphery of the valve rotor. In operation, the valve controls the direction of flow of hydraulic fluid to or from the power cylinder in accordance with the direction of a relative angular displacement, from a neutral position, between the input and the output shaft or between the valve rotor and the valve sleeve. The usual practice has been to provide a torsion bar interposed between the input and the output shaft to connect them together so that both the valve rotor and the valve sleeve can be maintained in their neutral position by the resilience of the torsion bar whenever the valve is non-operative. However, the neutral position of the valve rotor and the sleeve must be established when the torsional stress in the torsion bar remains zero in either direction. This makes it impossible to apply a bias load or preload across the input and the output shaft, by utilizing the torsion bar.

To overcome this difficulty, there is provided in the prior art a power steering apparatus including a substantially C-shaped spring formed of a ring-shaped spring material which is partly removed to define a notch, in addition to or in substitution for the torsion spring, so that projections integral with the input and the output shaft are simultaneously held between the end faces which define the notch in the C-shaped spring with a given magnitude of resilience, thus allowing the both shafts to be maintained in their neutral position while allowing them to be simultaneously preloaded. However, when such C-shaped spring is used in a power steering apparatus including a control valve of rotary type, there results an increased complexity and size in a region where the C-shaped spring is contained inside the valve sleeve integral with the output shaft, inasmuch as it is generally desirable, in view of strength consideration, that the projections be formed adjacent to the abutting ends of the input and the output shaft and the valve sleeve internally receives the input shaft and the valve rotor therein.

SUMMARY OF THE INVENTION

Therefore, it is an object of the invention to provide a power steering apparatus which has a reduced size and which employs a simplified arrangement for the control valve. This object is achieved by forming projections on the end of the valve sleeve and on the outer peripheral surface of a shaft on which the valve rotor is mounted, and by disposing a spring in surrounding relationship with these projections so that the both projections may be held in a notch formed therein by the resilience thereof to maintain both the input and the output shaft in a given position.

It is another object of the invention to provide a power steering apparatus of the type described in which a circumferential clearance between the both end faces of the notch of the spring and the projections is reduced substantially to zero so that the neutral position of the control valve can be accurately and reliably maintained and so that a sensitive steering response, which is free from play, can be obtained.

It is a further object of the invention to provide a power steering apparatus of the type described in which one of the projections held in the notch formed in the spring and which is associated with the input shaft, is formed to extend diametrically into abutment against the side surface of an inner race of a bearing which supports the input shaft, thus preventing a withdrawal of the input shaft.

It is still another object of the invention to provide a hydraulic bearing between the input and the output shaft by utilizing hydraulic fluid which is used in the control valve, thus reducing the number of parts used in and the axial length of the power steering apparatus.

Other objects and advantages of the invention will become apparent from the following description given with reference to the attached drawings.

DESCRIPTION OF EMBODIMENTS

Figure 1:
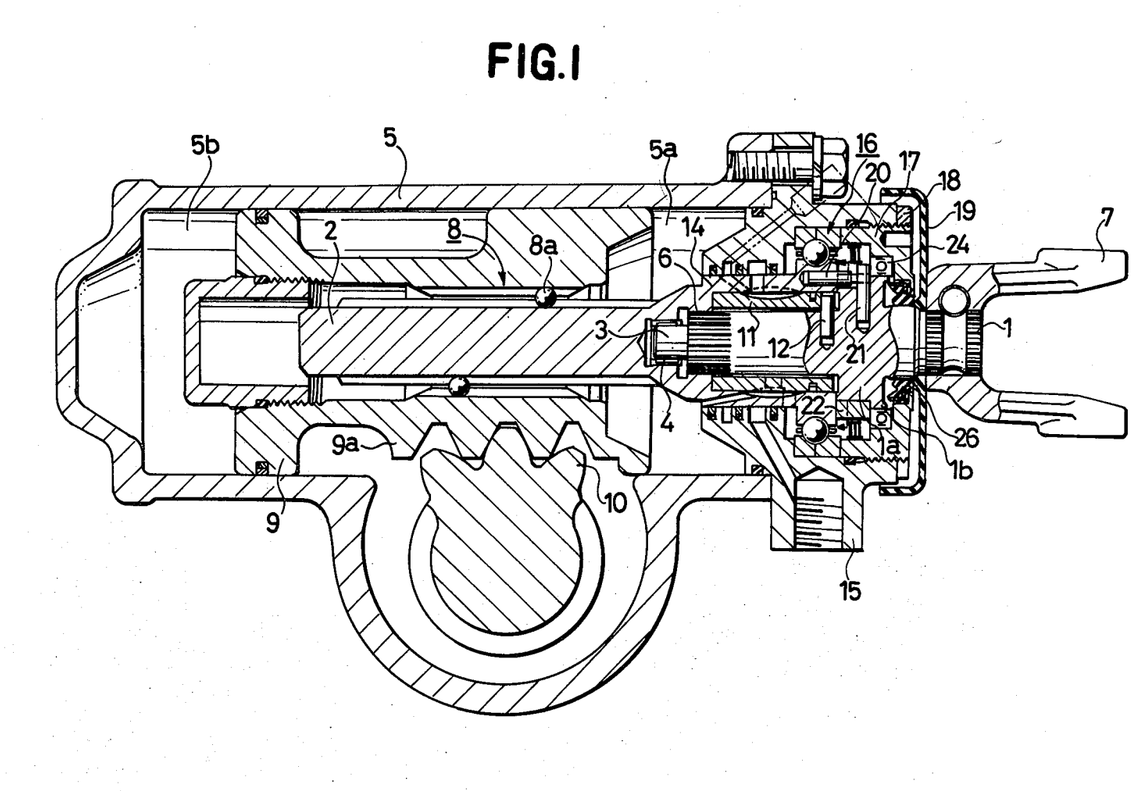
FIG. 1 is a longitudinal section of one embodiment of the invention.

Referring to FIG. 1, there are shown an input shaft 1 and an output shaft 2 which are disposed in coaxial relationship. On its free end, the input shaft 1 is provided with an axial extension 3 which is rotatably disposed within a needle bearing 4 which is in turn fitted into the adjacent axial end of the output shaft 2. It is to be understood that the input and the output shaft 1, 2 are inserted into a housing 5 through an open end thereof under such condition.

As shown in FIG. 1, an interlock 6 is formed around the root of the axial extension 3 to achieve a rotational coupling between the input and the output shaft 1, 2. In a similar manner as a conventional interlock provided between an input and an output shaft, the interlock 6 permits a relative rotation between the both shafts within a given limit, but couples them mechanically for intergral motion whenever the relative rotation exceeds the given limit.

The input shaft 1 is connected through a yoke 7 to a steering wheel, not shown, while the output shaft 2 is connected through a ball screw mechanism 8 including balls 8a to a piston 9 which is slidably received within the housing 5. The piston 9 reciprocates through a given stroke within the housing 5 as the output shaft 2 rotates either forwardly or reversely. On its bottom side, as viewed in FIG. 1, the piston 9 is formed with a rack 9a, which meshes with a sector gear 10 which is interlocked with a steerable road wheel, not shown, whereby the gear rotates either forwardly or reversely as the piston 9 reciprocates. Pressure chambers 5a, 5b are formed within the housing 5 on the opposite sides of the piston 9, as shown in FIG. 1, and an auxiliary drive to the piston 9 is supplied by hydraulic fluid which is supplied to these pressure chambers 5a, 5b through a control valve to be described later.

Figure 2:
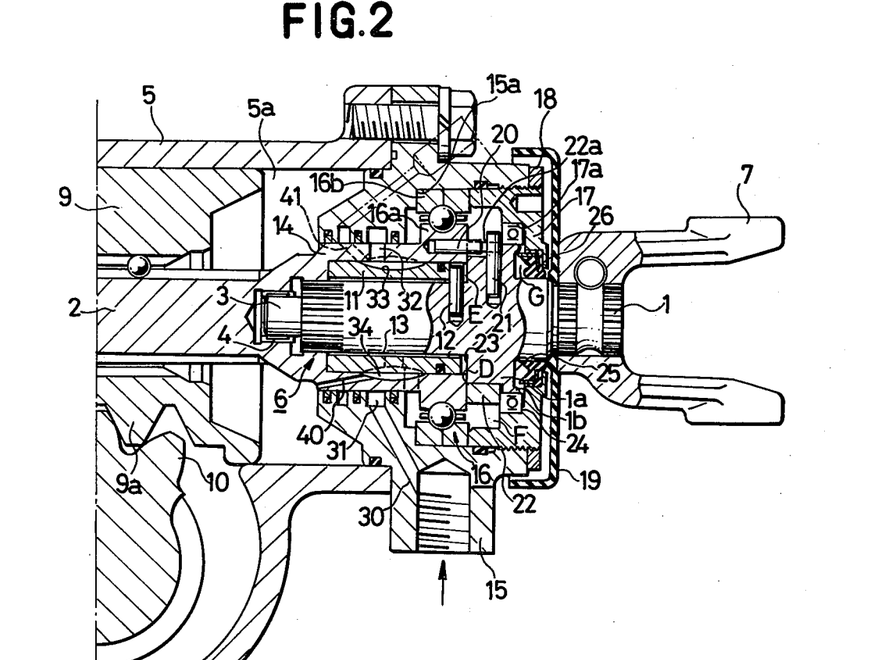
FIG. 2 is a fragmentary enlarged cross section of FIG. 1.
Figure 4:
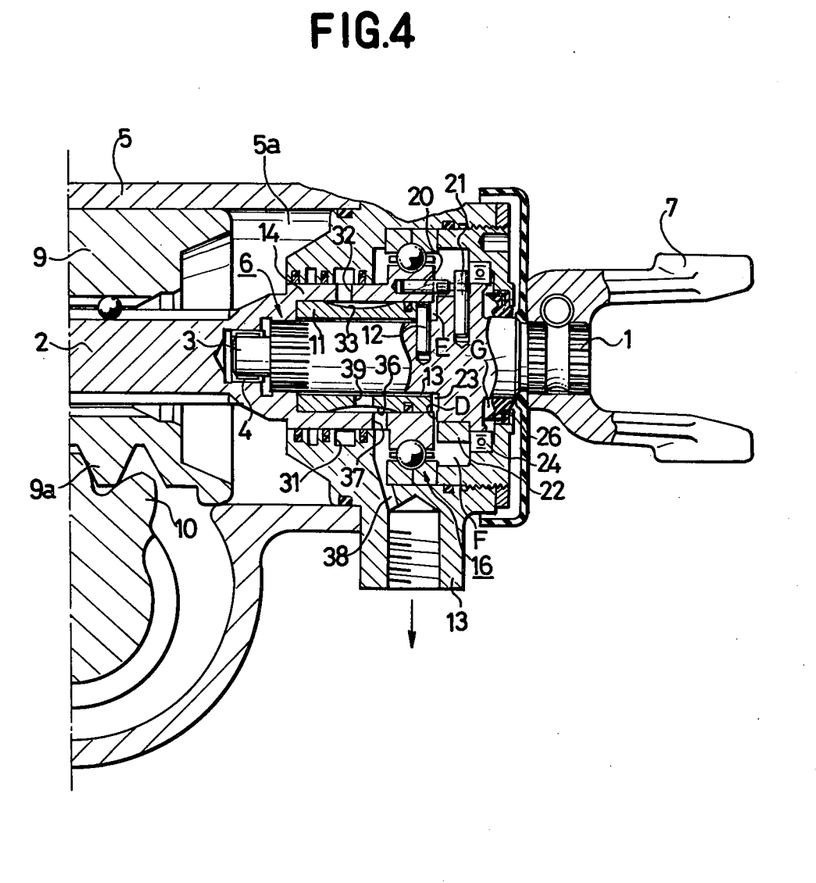
FIG. 4 is a cross section of a portion of the control valve as taken through a different plane from that of FIG. 2.
Figure 9:
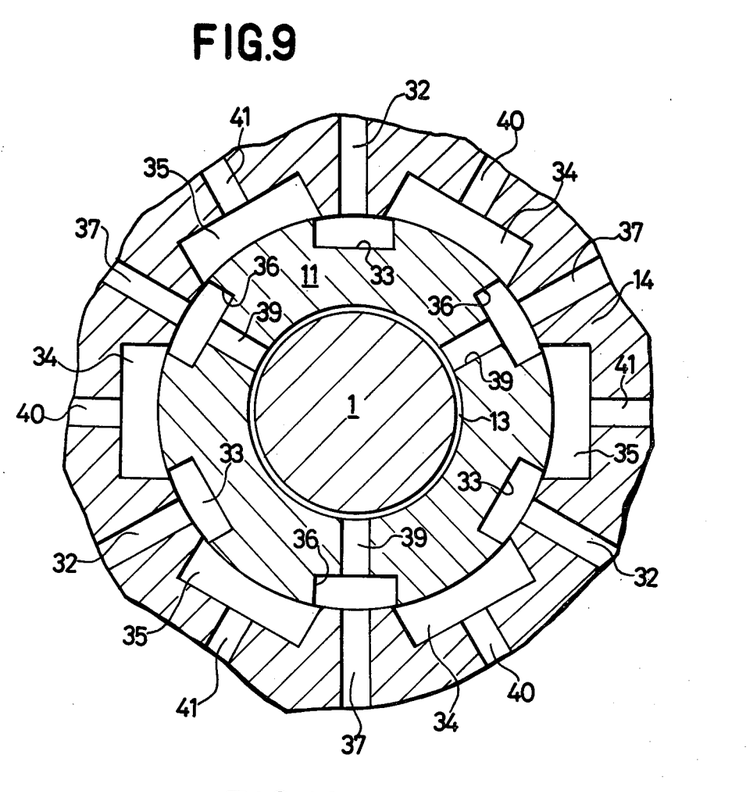
FIG. 9 is a cross section of a portion of the control valve taken through a plane perpendicular to the axis thereof.

As shown in FIGS. 1, 2 and 4, a cylindrical valve rotor 11 is integrally fitted around the periphery of the input shaft 1 at a location on the opposite side of the interlock 6 from the free end thereof, and is secured thereto by a pin 12. A given clearance 13 is defined between the input shaft 1 and the valve rotor 11 as shown in detail in FIG. 9. A cylindrical portion of the output shaft 2 which is located opposite to the valve rotor 11 defines a valve sleeve 14, the outer peripheral surface of which is disposed in sliding contact with a valve housing 15 which is mounted into and closes the open end of the housing 5. In this manner, the combination of the valve rotor 11 and the valve sleeve 14 basically forms a control valve of rotary type which is known in its itself in the prior art.

On its outer periphery, the right-hand end, as viewed in FIG. 2, of the output shaft 2 is integrally formed with an inner race 16a, forming part of a bearing 16 which rotatably supports the output shaft 2. The bearing 16 also includes an outer race 16b which is mounted inside the valve housing 15 and having its one side disposed in abutment against a step 15a of the valve housing. An adjusting plug 17 which is threadably fitted into the end of the valve housing 15 has its free end disposed in bearing relationship with the other side of the outer race 16b, whereby the outer race is held stationary between the step 15a and the plug 17. The plug 17 is locked against withdrawal by a nut 18 which is threadably engaged with the end of the plug 17, both the plug 17 and the nut being surrounded by a cover 19 which is mounted on the input shaft 1.

On its outer side, the inner race 16a of the bearing 16 is provided with a projection 29 which extends axially outward, and another projection 21, extending diametrically, is mounted on the outer periphery of a portion 1a of the input shaft 1 having an increased diameter and which has its end face peripherally bearing against the surface of the inner race through which the projection 20 extends. These projections 20, 21 are held between the opposite end faces of a notch 22a formed in a C-shaped spring 22 which is disposed in surrounding relationship with the portion 1a of the input shaft. Specifically, the C-shaped spring 22 is disposed between the end face of the inner race 16a and the end face of an inner race of a bearing 24, to be described later. Except for its peripheral region, the end face of the portion 1a of the input shaft adjacent to its axis is formed with a recess 23, to which hydraulic fluid passing through the control valve is supplied through the clearance mentioned above to define a hydraulic thrust bearing. It is to be understood that the axial dimension can be reduced by defining the thrust bearing by means of the hydraulic fluid rather than using a mechanical bearing.

Figure 3:
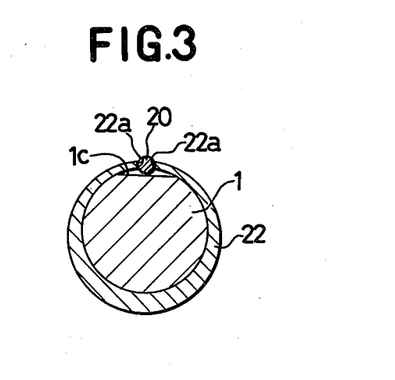
FIG. 3 is a view taken along the line III—III and as viewed in the direction of an arrow shown in FIG. 1.
Figure 5:
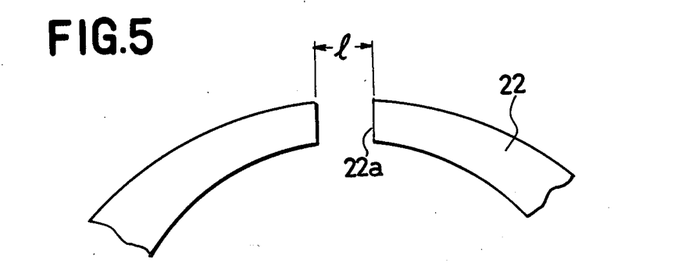
FIG. 5 is an illustration of a C-shaped spring, showing the natural condition of a notch formed therein.
Figure 6:
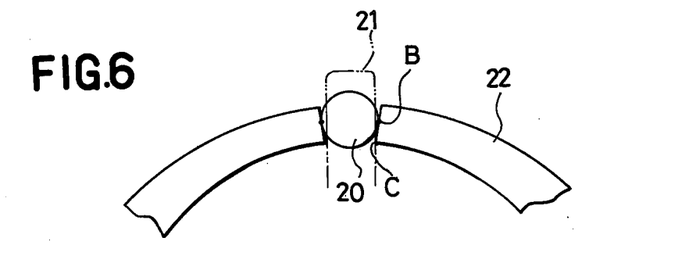
FIG. 6 is an illustration of the C-shaped spring, specifically showing the notch and projections held therein in the neutral position of the spring.

As shown in FIG. 3, a region of the peripheral surface of the input shaft which is located opposite to the axial projection 20 is shaved as shown at 1c to prevent a contact of the projection 20 therewith. It is to be understood that in its natural or unstressed condition, the notch 22a formed in the C-shaped spring 22 has a circumferential length l which is less than the circumferential dimensions of the projections 20, 21 as indicated in FIGS. 5 and 6. Consequently, a desired preload can be applied across the input and the output shaft 1, 2 by holding the projections 20, 21 between the end faces of the notch formed in the C-shaped spring 22. Also, as shown in FIG. 5, in its natural or unstressed condition, the both end faces of the notch 22a are parallel to each other. As a result, when the spring 22 is fitted around the input shaft 1, the spacing between the both end faces of the notch 22a gradually increases in a radially outward direction, thus forming an angle therebetween. As illustrated in FIGS. 3 and 6, the axis of the axial projection 20 is located at the center of the thickness of the spring 22, and hence when the both projections 20, 21 have an equal circumferential dimension or diameter, it follows that in the neutral position of the control valve in which no external force is applied upon the input and the output shaft 1, 2, only the diametrical projection 21 interacts with the C-shaped spring 22 without accompanying an engagement of the axial projection 20 with either end face of the notch 22a formed in the spring 22. To accommodate for this, in accordance with the invention, the axial projection 20 has a circumferential dimension greater than that of the diametrical projection 21 as shown in FIG. 6. In the neutral position of the control valve, the both projections 20, 21 bear against the opposite end faces of the notch 22a at points B and C, respectively, whereby the input and the output shaft 1, 2 are firmly maintained in their accurate neutral positions.

Referring to FIG. 3, it will be seen that the C-shaped spring 22 has a thickness which is at its minimum in a region adjacent to the notch 22a, and which increases toward a point which is diametrically opposite to the notch 22a in a gradual manner, so that stresses produced in the spring 22 as a result of the forces applied to the projections 20, 21 can be made uniform throughout. Alternatively, to produce a uniform stressing, the spring 22 may have a width which gradually increases toward a point which is diametrically opposite to the notch. The end faces of the notch 22a may be provided with flanges in order to increase the area of contact with the diametrical projection 21.

The input shaft 1 has another portion 1b of a diameter which is still greater than that of the portion 1a and which is contiguous with the portion 1a on the opposite side from the free end of the input shaft. The portion 1b is rotatably received within a bearing 24 which is disposed on a step 17a of the plug 17, and the outer side face of the portion 1b is formed with an annular recess 25 in which a gasket 26 is disposed partly overlapping with the bearing 24. The axial overlapping relationship between the bearing 24 and the gasket 26 allows the axial length of the arrangement to be reduced. The diametrical projection 21 is disposed in abutment against the lateral side of the inner race of the bearing 24, thus preventing withdrawal of the input shaft 1 from the output shaft 2. The diametrical projection 21 also serves as a thrust stop for the input shaft 1, thus dispensing with a separate provision of a thrust stop to simplify the struction and enabling a reduction in the axial dimension.

Describing the operation, the control valve comprising the valve rotor 11 and the valve sleeve 14 merely operates to circulate hydraulic fluid from a pump, not shown, in the neutral condition. Specifically, hydraulic fluid from such pump passes through a supply opening 30 and an annular groove 31 formed in the valve housing 15 and a diametrical passage 32 formed to extend through the valve sleeve 14 into an axial supply groove 33 which is formed in the valve rotor 11, and thence into axial grooves 34, 35 formed in the inner surface of the valve sleeve 14 so as to be capable of aligning with the opposite circumferential sides of the grooves 33, and into an axial discharge groove 36 which is formed in the valve rotor 11 and capable of being aligned with the grooves 34, 35. The hydraulic fluid passes from the discharge groove 36 through a diametrical passage 37 formed in the valve sleeve 14 and through a discharge opening 38 formed in the valve housing 15 to return to the suction side of the pump. The hydraulic fluid also passes through a diametrical groove 39 formed in the valve rotor 11 and through the clearance 13 defined between the input shaft 1 and the valve rotor 11 to the needle bearing 4, and thence into the interlock 6 and the recess 23 formed in the end face of the portion 1a of the input shaft. It is to be noted that a space F in which the C-shaped spring 22 is disposed and another space G in which the gasket 26 is located communicate with the discharge opening 38 through gaps formed in the bearings 16, 24, but a space E defined by the recess 23 is disconnected from the spaces F and G whenever the peripheral region D of the end face of the portion 1a closely bears against the end face of the valve sleeve 14.

One of the grooves, 34, located on the opposite sides of the supply groove 33, communicates with one of the pressure chambers, 5a, of the housing 5 through a diametrical passage 40 while the other groove 35 communicates with the other pressure chamber 5b through a passage 41. However, in the neutral position, the supply groove 33 presents an equal area of flow path to each of the grooves 34, 35 located on the opposite sides thereof, thus producing no pressure differential across the grooves 34, 35 to maintain the piston 9 inoperative.

However, when the input shaft 1 rotates in one direction, there occurs a relative rotation between the both projections 20, 21, and hence between the valve rotor 11 and the valve sleeve 14, against the resilience of the C-shaped spring 22, whereby a difference occurs in the area of flow paths between the supply groove 33 on one side and the grooves 34, 35 located on the opposite sides thereof, on the other hand. In this manner, a pressure differential is produced between the both grooves 34, 35. A resulting pressure differential across the pressure chambers 5a, 5b which communicate with these grooves 34, 35 acts to operate the piston 9, thus imparting an assisting steering force as known in the art.

It is to be noted that the discharge groove 36 communicates with the suction side of the pump through the diametrical passage 37 and the discharge opening 38, and also communicates with the space E through the diametrical groove 39 and the clearance 13.

When the diametrical passage 37 has a diameter or an area of flow path which is insufficient to supply a sufficient amount of returning hydraulic fluid, a pressure differential of a magnitude which depends on such diameter will be developed across the passage 37 or between the discharge groove 36 and the discharge opening 38. Similarly, pressure differentials are developed across the space E and the spaces F and G simultaneously, whereby there is produced a hydraulic pressure within the space E which urges the input shaft 1 toward the yoke 7. As a result, the peripheral region D of the portion 1a of the input shaft which has been held tightly against the output shaft 2 moves away therefrom, establishing a communication between the spaces E and F. The hydraulic fluid which finds its way into the space F is discharged into the discharge opening 38 through the gap in the bearing 16. As the hydraulic fluid flows from the space E into the space F, the peripheral region D is again returned into tight abutment against the output shaft 2, thus again interrupting a communication between the both spaces E and F.

Since a hydraulic pressure is always developed within the space E, there is formed a hydraulic thrust bearing between the input shaft 1 and the output shaft 2, thus dispensing with a separate provision of a mechanical bearing therebetween as is found in the prior art. By changing the diameter of the diametrical passage 37, the magnitude of the hydraulic pressure acting upon the input shaft 1 within the space E can be adjusted.

Figure 10:
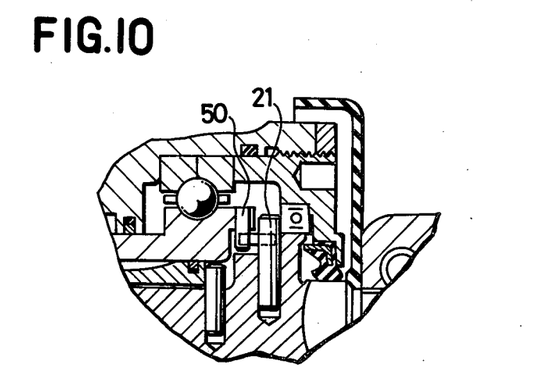
FIG. 10 is a fragmentary enlarged section of another embodiment of the invention.

In the described embodiment, the axial projection 20 is formed on the output shaft 2, but alternatively, the end face of the inner race 16a of the bearing 16 may be formed with an inwardly extending projection 50 as shown in FIG. 10.

Figure 7:
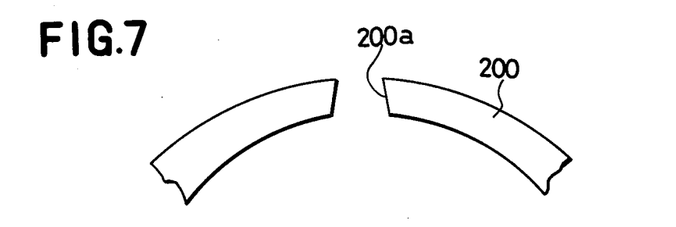
FIG. 7 shows a modification of C-shaped spring under its natural condition.
Figure 8:
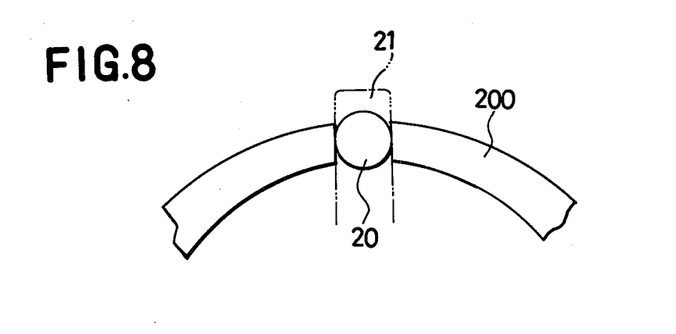
FIG. 8 shows the C-shaped spring of FIG. 7 together with projections held therein under its natural condition.

Also, in the described embodiment, the C-shaped spring 22 is formed so that the opposite end faces of the notch 22a extend parallel to each other in its natural or unstressed condition as shown in FIG. 4. Alternatively, a C-shaped spring 200 may be used as shown in FIG. 7 in which the opposite end faces of a notch 200a formed therein form a spacing therebetween which gradually decreases radially outward in its natural or unstressed condition. With such spring 200, when the spring is mounted on the input shaft 1, the opposite end faces of the notch 200a will run parallel to each other as shown in FIG. 8, and thus both the diametrical projection 21 and the axial projection 20 may have an equal diameter.

Also, the output shaft 2 may carry a valve rotor 11 and the input shaft 1 may carry a valve sleeve 14, in a manner opposite from that described in the above embodiment.

In the described embodiments, the projections 20, 21 are in the form of pins which are separate from the input and the output shaft 1, 2, but these projections may be integral with these shafts.

It should be understood that the invention is not limited in its application to a power steering apparatus including a ball screw mechanism shown, but is equally applicable to power steering apparatus of other types. Also, the invention is not limited to a control valve comprising a valve rotor 11 and a valve sleeve 14, but is also applicable to power steering apparatus including a control valve of so-called disc type, flapper type or spool type.

While the invention has been shown and described above in detail with reference to particular embodiments thereof, it should be understood that a number of changes and modifications are possible therein without departing from the spirit and scope of the invention, and therefore it is intended that the invention is solely defined by the appended claims.

What is claimed is:

1. A power steering apparatus having an input portion and an output portion and comprising:

an input shaft at said input portion for connection with a steering wheel;

an output shaft at said output portion and disposed in coaxial relationship with the input shaft and adapted to be connected to a steerable road wheel;

a control valve for controlling the supply to or discharge from a power cylinder of hydraulic fluid in accordance with a relative angular displacement between the input and the output shafts;

a pair of engaging elements disposed on said input and output portion, respectively, for integral rotation therewith; and a substantially C-shaped spring disposed around one of (1) said engaging element on the input portion and (2) said input shaft, the resilience of the spring serving to maintain said engaging elements in a given position, said substantially C-shaped spring has a notch formed therein, the cross-sectional area of said spring being gradually increased toward a point on its circumference located diametrically opposite the said notch, such that stresses produced therein are substantially uniform throughout.

2. A power steering apparatus according to claim 1 in which the end faces of the notch formed in the C-shaped spring are provided with flanges.

3. A power steering apparatus according to claim 1 in which the C-shaped spring is adapted to flex in the circumferential direction in accordance with a relative angular displacement between the input and the output shaft.

4. A power steering apparatus according to claim 1 in which the thickness of the spring gradually increases toward a point on its circumference which is diametrically opposite to the notch.

5. A power steering apparatus according to claim 1 in which the spring has a width which increases gradually toward a point on its circumference which is located diametrically opposite to the notch.

6. A power steering apparatus having an input portion and an output portion and comprising:

an input shaft at said input portion for connection with a steering wheel;

an output shaft at said output portion and disposed in coaxial relationship with the input shaft and adapted to be connected to a steerable road wheel;

a control valve for controlling the supply to or discharge from a power cylinder of hydraulic fluid in accordance with a relative angular displacement between the input and the output shafts;

a pair of engaging elements disposed on said input and output portion, respectively, for integral rotation therewith; and a substantially C-shaped spring disposed around one of (1) said engaging element on the input portion and (2) said input shaft, the resilience of the spring serving to maintain said engaging elements in a given position, in which the input shaft is provided with a portion of an increased diameter, the end face of which is disposed in opposing relationship with an abutting surface of the output shaft, and wherein the control valve is formed with an outlet passage for hydraulic fluid which has a varying area of flow path so that a pressure differential is developed across the outlet passage, the hydraulic fluid in an inlet side of the outlet passage acting upon the end face of the portion of the input shaft to provide a hydraulic thrust bearing between the input and the output shaft.

7. A power steering apparatus according to claim 6 in which said control valve includes elements respectively rotatable with said input shaft and output shaft, the engaging elements being integrally formed on one of (1) the input shaft and the output shaft and (2) the control valve elements rotated with the input shaft and the output shaft.

8. A power steering apparatus according to claim 6 in which said control valve includes elements respectively rotatable with said input shaft and output shaft, the engaging elements being integrally formed respectively (1) on the control valve element which is rotatable with the input shaft and (2) on the output shaft or on the other valve element which is rotatable with the latter.

9. A power steering apparatus according to claim 6 in which one of the engaging elements comprises a diametrically extending projection while the other engaging element comprises an axially extending projection.

10. A power steering apparatus according to claim 9 in which the diametrical projection is formed on the input shaft while the axial projection is formed on the output shaft.

11. A power steering apparatus according to claim 9 in which a circumferential clearance between the opposite end faces of the notch formed in the spring and the both projections is substantially zero in the neutral position of the control valve.

12. A power steering apparatus having an input portion and an output portion and comprising:

an input shaft at said input portion for connection with a steering wheel;

an output shaft at said output portion and disposed in coaxial relationship with the input shaft and adapted to be connected to a steerable road wheel;

a control valve for controlling the supply to or discharge from a power cylinder of hydraulic fluid in accordance with a relative angular displacement between the input and the output shafts;

a pair of engaging elements disposed on said input and output portion, respectively, for integral rotation therewith; and a substantially C-shaped spring disposed around one of (1) said engaging element on the input portion and (2) said input shaft, the resilience of the spring serving to maintain said engaging elements in a given position, said substantially C-shaped spring being formed as a cylinder with a notch therethrough to provide two end faces circumferentially opposed, said engaging elements including a first projection extending axially and a second projection extending radially, in which the first and second projections have different circumferential dimensions to make the circumferential gap between the opposite end faces of the notch and both projections substantially zero.

13. A power steering apparatus having an input portion and an output portion and comprising:

an input shaft at said input portion for connection with a steering wheel;

an output shaft at said output portion and disposed in coaxial relationship with the input shaft and adapted to be connected to a steerable road wheel;

a control valve for controlling the supply to or discharge from a power cylinder of hydraulic fluid in accordance with a relative angular displacement between the input and the output shafts;

a pair of engaging elements disposed on said input and output portion, respectively, for integral rotation therewith; and a substantially C-shaped spring disposed around one of (1) said engaging element on the input portion and (2) said input shaft, the resilience of the spring serving to maintain said engaging elements in a given position, in which the engaging elements are in the form of projections, one of said projections being disposed on the input shaft, and a bearing disposed in surrounding relationship with the input shaft to support it in a rotatable manner, the bearing having an inner race, and in which said projection disposed on the input shaft is also disposed in engagement with the lateral side of the inner race to prevent a withdrawal thereof.

14. A power steering apparatus according to claim 13 in which the bearing is mounted on a portion of the input shaft which has an increased diameter, the lateral side of the portion being formed with an annular recess in which a gasket is disposed, at least part of the bearing axially overlapping the gasket.

15. A power steering apparatus according to claim 6 in which the engaging elements include one projection extending radially outward and one projection extending radially inward.

* * * * *